US012095184B2

(12) United States Patent
Miyahara et al.

(10) Patent No.: US 12,095,184 B2
(45) Date of Patent: Sep. 17, 2024

(54) CONNECTOR AND CONNECTOR ASSEMBLY

(71) Applicant: Molex, LLC, Lisle, IL (US)

(72) Inventors: Kenji Miyahara, Yamato (JP); Mikiji Tanaka, Yamato (JP); Hiroshi Shimoyama, Yamato (JP); Yoshiteru Nogawa, Yamato (JP)

(73) Assignee: Molex, LLC, Lisle, IL (US)

( * ) Notice: Subject to any disclaimer, the term of this patent is extended or adjusted under 35 U.S.C. 154(b) by 288 days.

(21) Appl. No.: 17/630,516

(22) PCT Filed: Sep. 24, 2020

(86) PCT No.: PCT/US2020/052351
§ 371 (c)(1),
(2) Date: Jan. 27, 2022

(87) PCT Pub. No.: WO2021/071676
PCT Pub. Date: Apr. 15, 2021

(65) Prior Publication Data

US 2022/0247104 A1 Aug. 4, 2022

(30) Foreign Application Priority Data

Oct. 11, 2019 (JP) ................................ 2019-187288

(51) Int. Cl.
*H01R 12/71* (2011.01)
*H01R 12/91* (2011.01)
(Continued)

(52) U.S. Cl.
CPC ........... *H01R 12/716* (2013.01); *H01R 12/91* (2013.01); *H01R 13/2407* (2013.01);
(Continued)

(58) Field of Classification Search
CPC .. H01R 12/716; H01R 12/91; H01R 13/2407; H01R 13/40; H01R 13/2442;
(Continued)

(56) References Cited

U.S. PATENT DOCUMENTS 6,692,266 B2 2/2004 Hashiguchi et al.
7,410,364 B2 * 8/2008 Kishi .................. H01R 12/716 439/570

(Continued)

FOREIGN PATENT DOCUMENTS

JP H0654237 U 7/1994
JP H07263091 A 10/1995

(Continued)

OTHER PUBLICATIONS

International Search Report and Written Opinion received for PCT Application No. PCT/US2020/052351 mailed on Feb. 3, 2021, 07 Pages.

*Primary Examiner* — Travis S Chambers

(57) ABSTRACT

A terminal including a main body part retained by a connector main body and a contact part connected to the upper end of the main body part and the free end of which can be connected to a counterpart terminal of a counterpart connector. The contact part including a connector base connected to the upper end of the main body part, a spring arm connected to the tip of the connector base and bent in a substantially s-shape, and a contact flexure part formed near the free end of the spring arm. The connector main body including a pair of side wall parts that extend in the longitudinal direction thereof and that retain the main body part. The connector base including an outward expanding part that bulges outward from the upper end of the main body part toward the connector main body and straddling the side wall parts without making contact with the side wall parts.

20 Claims, 13 Drawing Sheets

(51) Int. Cl.
*H01R 13/24* (2006.01)
*H01R 13/40* (2006.01)
*H01R 13/11* (2006.01)

(52) U.S. Cl.
CPC ............ *H01R 13/40* (2013.01); *H01R 13/113* (2013.01); *H01R 13/114* (2013.01)

(58) Field of Classification Search
CPC ........ H01R 13/41; H01R 12/57; H01R 13/10; H01R 13/113; H01R 13/114; H01R 13/35
See application file for complete search history.

(56) References Cited

U.S. PATENT DOCUMENTS

| | | | | |
|---|---|---|---|---|
| 8,435,052 | B2 | 5/2013 | Potters | |
| 2004/0063344 | A1* | 4/2004 | Shin ....................... | H01R 13/26 439/74 |
| 2007/0042621 | A1 | 2/2007 | Chen et al. | |
| 2008/0003862 | A1 | 1/2008 | Yuan et al. | |
| 2009/0318029 | A1 | 12/2009 | Takeuchi et al. | |
| 2018/0183189 | A1* | 6/2018 | Chuang .............. | H01R 13/6585 |

FOREIGN PATENT DOCUMENTS

| | | | |
|---|---|---|---|
| JP | H1021981 | A | 1/1998 |
| JP | 2005209441 | A | 8/2005 |
| JP | 5786515 | B2 | 9/2015 |
| JP | 2018073747 | A | 5/2018 |
| WO | 2011057256 | A2 | 5/2011 |

* cited by examiner

CONNECTOR AND CONNECTOR ASSEMBLY

RELATED APPLICATION

This application claims priority to Japanese Application Serial No. 2019-187288, filed on Oct. 11, 2019, which is incorporated by reference in its entirety.

TECHNICAL FIELD

The present disclosure relates to a connector and a connector assembly.

BACKGROUND ART

Conventionally, with a substrate connector mounted on a substrate, technology using a terminal with a structure enabling absorbing misalignment through elastic deformation has been proposed for absorbing misalignment with a counterpart connector (for example, see patent reference 1).

FIG. 12 is a perspective view illustrating a conventional connector terminal.

In the diagram, 851 is a terminal of a board connector not shown that is mounted on the surface of a circuit board 901. This terminal 851 is fabricated by punching and bending a metal plate, made up of a flat plate main body 852 extending in a vertical direction relative to the surface of the circuit board 901, a pair of left and right leg pieces 853 connected to the lower end of the main body 852, a contact arm 854 connected to the upper end of the main body 852, and a tail part 856 connected and secured using solder 903 to a connecting pad 902 formed on the surface of the circuit board 901. Note that the leg pieces 853 are members for maintaining the freestanding state of the terminal 851 when the tail part 856 is connected and secured to the connecting pad 902 using solder 903, and are formed to be on the same plane as the tail part 856; however, they are not secured to the surface of the circuit board 901.

The contact arm 854 is a member curved in a substantially U-shape when viewed from the side and is elastically deformable. Furthermore, a base end part **854*b* is connected to the upper end of the main body 852, and a curved contact part 854*a* is formed near the tip so as to bulge forward. As the entire contact arm 854 functions as a spring, the contact part 854*a*** is pressed by spring-force against the counterpart terminal of the counterpart connector (not shown), enabling maintaining a good contact condition.

Furthermore, the tail part 856 is connected to the main body 852 via a bending piece 855, which is curved in a substantially U-shape when viewed from the rear. The bending piece 855 is stowed within a notch part **852*a* formed on the main body 852, with one end connected to the tail part 856 and the other end connected to the main body 852 within the notch part 852*a*. The left and right sides of the main body 852 are formed with a retained part 852*b***, which is stowed and retained in a retaining groove of the housing (not shown) of the board connector.

When the housing is secured to the surface of the circuit board 901 after the terminal 851 is mounted on the surface of the circuit board 901, the housing is secured to the surface of the circuit board 901 by a screw member or the like (not shown), with the retained part **852*b* stowed and retained in the retention groove of the housing. In this case, a misalignment may occur between the position of the terminal 851, where the tail part 856 is secured to the surface of the circuit board 901, and the position of the retaining groove of the housing, resulting in a misalignment of the contact part 854*a*, however, the bending piece 855 interposed between the tail part 856 and the main body 852** may elastically deform to absorb the misalignment.

Patent Document 1: Japanese Unexamined Patent Application No. 2013-025975

SUMMARY

However, the conventional connectors are not sufficiently suited to the miniaturization of components and multipolarity of signals in recent electronic devices. The compactness and low profile of the case and accompanying components is required in various electronic devices, and the use of multiple poles is also required in order to handle an increase in the amount of communication data and higher communication speeds and data processing speeds. However, the terminal 851 for conventional connectors as described above is large, and not able to meet the demands of making connectors compact and low profile. In order to increase the speed of various signals, a large number of terminals 851 may also be required (multipolar), however, as the terminals 851 are large in conventional connectors, if, for instance, a large number of terminals 851 were combined (multipole), it is easy to assume that the conventional connector would be very large. Furthermore, as conventional connectors are designed to absorb the misalignment of the contact part **854*a* with only one bending piece 855**, suitably absorbing the misalignment in multiple directions is difficult.

Here, an objective of the present invention is to resolve the problems of conventional connectors, to enable equipping of terminals with high spacing efficiency, and to provide a highly reliable connector and connector assembly that in addition to being compact and low-profile, enables suitable absorbing of contact misalignment.

SUMMARY

Therefore, the connector includes a connector body and a terminal attached to the connector body, which is mounted on a board and mates with a counterpart connector. The terminal includes a main body part retained in the connector body and a contact part that is connected to the upper end of the main body part, where the vicinity of the free end of which can be connected to the counterpart terminal of the counterpart connector. The contact part includes a connector base connected to the upper end of the main body part, a spring arm part bent substantially in an S shape and connected to the tip of the connector base, and a contact flexure part formed in the vicinity of the free end of the spring arm part. The connector main body extends in the longitudinal direction thereof and includes a pair of side walls that retain the main body part. The connector base includes an outward expanding part that expands outwardly from the connector main body from the upper end of the main body part and straddles the side walls without contacting the side walls.

For another connector, the connector base further includes an upper portion extending from the top of the outward expanding part toward the inside of the connector main body.

For yet another connector, the contact part rotates with the outward expanding part as a fulcrum when the contact flexure part makes contact with the counterpart terminal and contact pressure is applied.

For yet another connector, the outward expanding part is capable of absorbing vibrations in the vertical direction through elastic deformation.

For yet another connector, the spring arm part includes a plate material narrower than the connector base, and is capable of absorbing vibrations in the width direction of the terminal through elastic deformation in the width direction of the terminal.

For yet another connector, the spring arms further include two flexibly deformable flexure parts.

The connector assembly is made up of the connector according to the present disclosure and a counterpart connector provided with a counterpart terminal that can connect with the terminal contact part.

The present disclosure enables equipping with high space efficiency terminals, is compact and low-profile, enables suitably absorbing contact part misalignment, and improves reliability.

BRIEF DESCRIPTION OF THE DRAWINGS

FIGS. 1A and 1B are perspective views according to the present embodiment from the second connector side illustrating the positional relationship between the first connector and the second connector prior to mating, wherein FIG. 1A is an oblique view from the front and FIG. 1B is an oblique view from the rear.

FIG. 4A is a plan view, FIG. 4B is a sectional view taken along the A-A line in FIG. 4A, and FIG. 4C is a sectional view taken along the B-B line in FIG. 4A.

FIG. 5A is a plan view, FIG. 5B is a sectional view taken along the C-C line, and FIG. 5C is a sectional view taking along the D-D line.

FIGS. 11A-11C are three view drawings illustrating a state in which the first connector and second connector according to the present embodiment are mated, wherein FIG. 11A is a plan view, FIG. 11B is a cross sectional view taken along the E-E line in FIG. 11A, and FIG. 11C is a cross sectional view taken along the F-F line in FIG. 11A.

DETAILED DESCRIPTION OF THE PREFERRED EMBODIMENTS

Embodiments will hereinafter be described in detail with reference to the drawings.

Figure 1A:
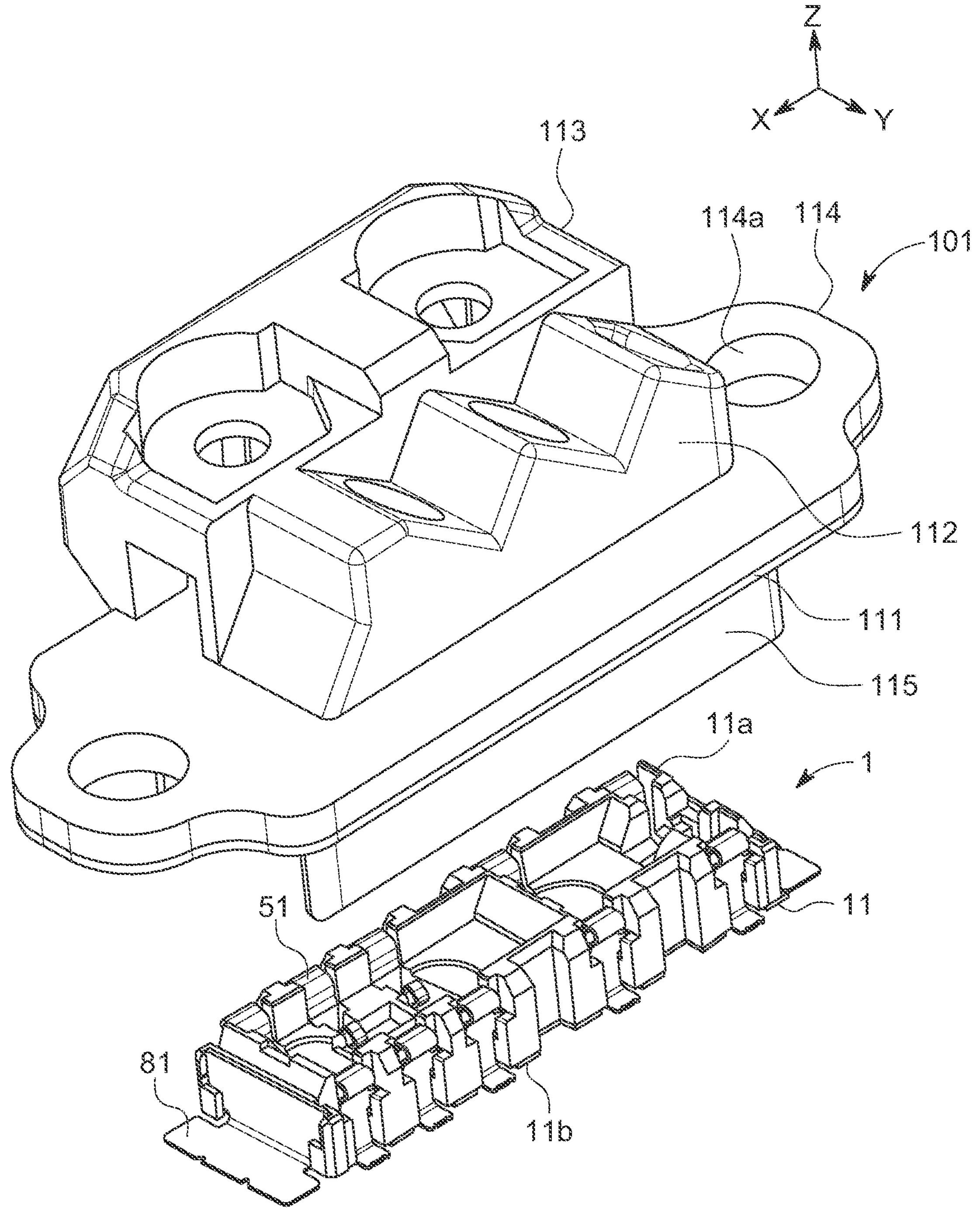
Figure 1B:
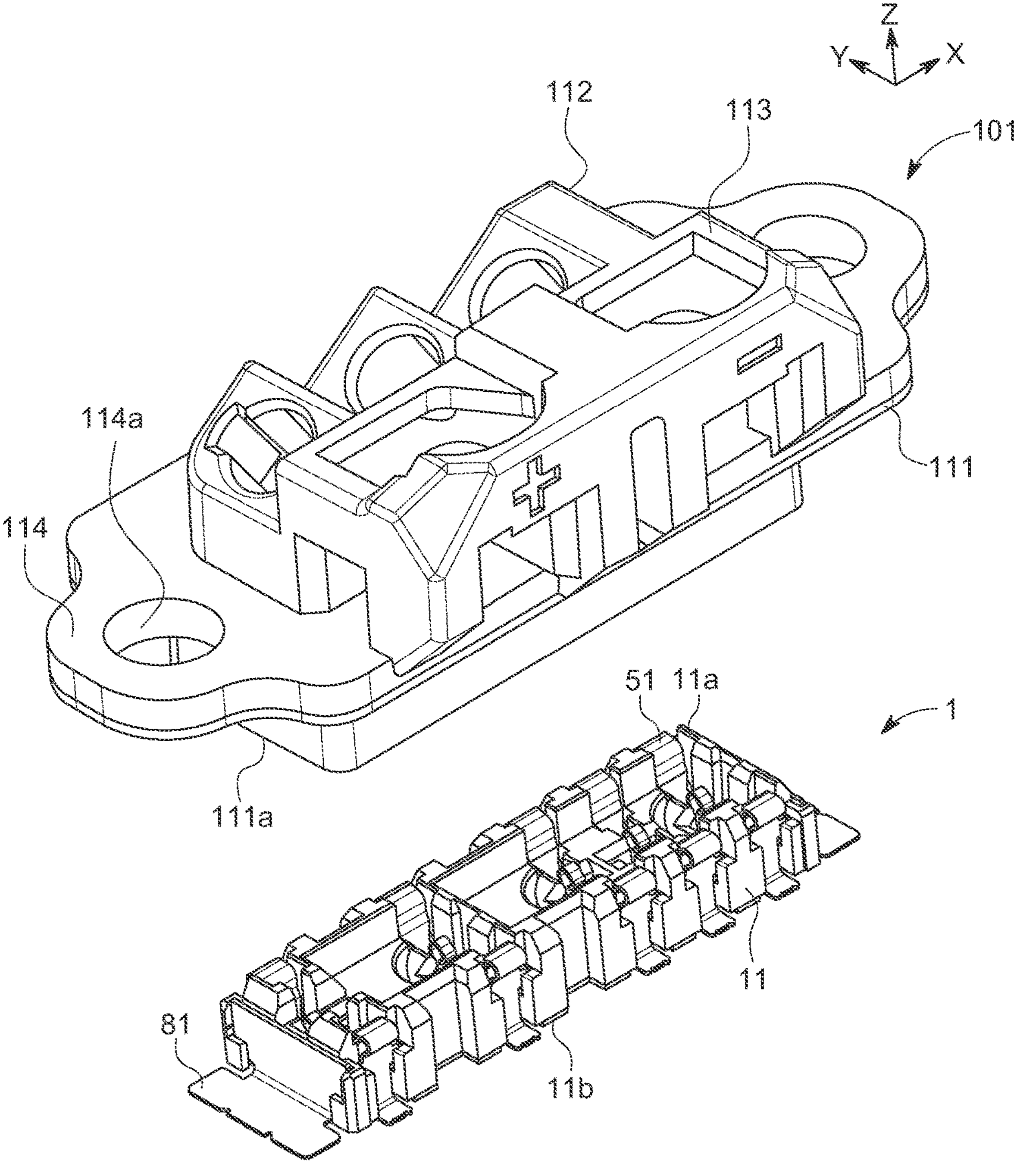
Figure 2:
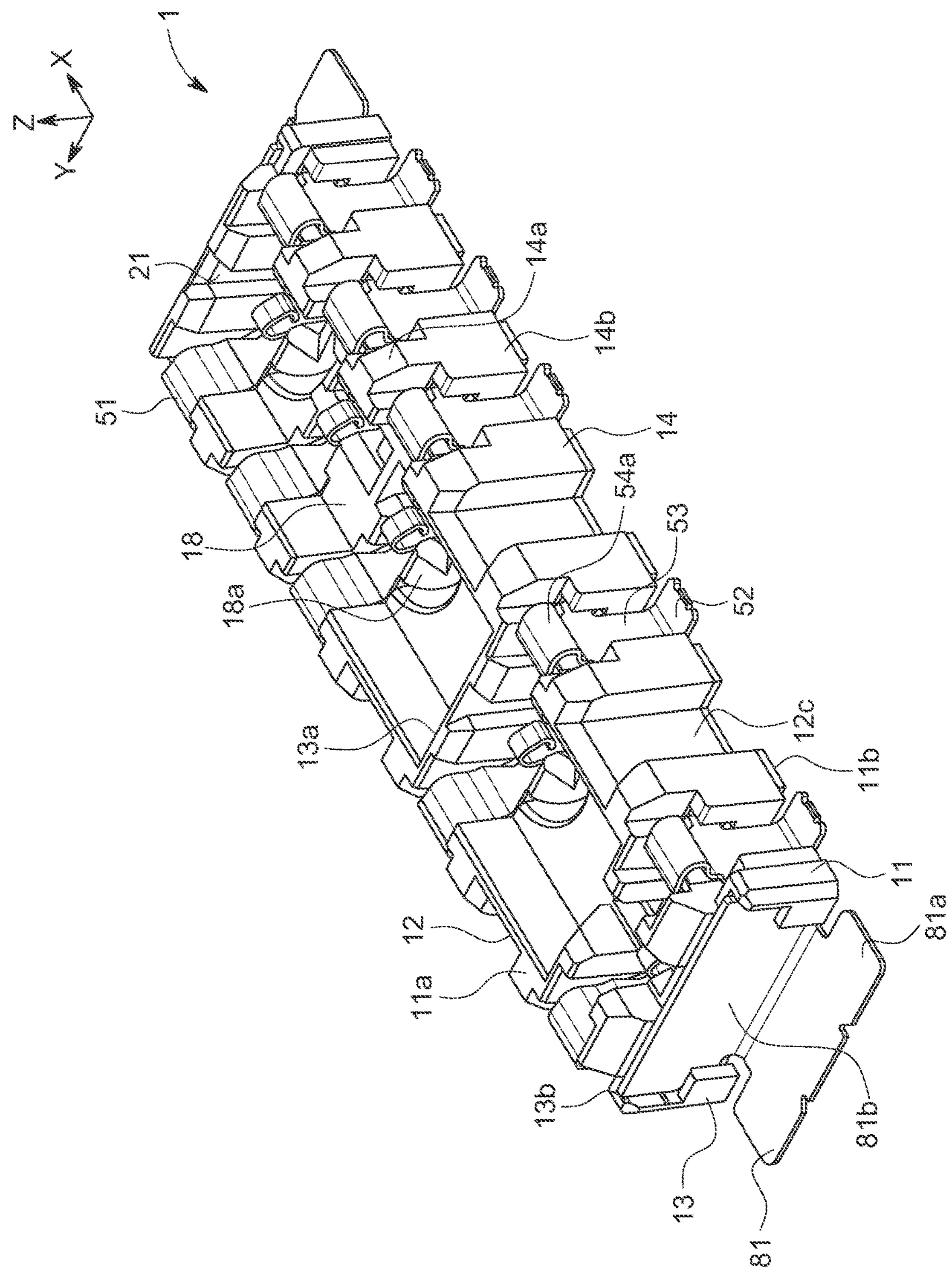
FIG. 2 is a perspective view of the first connector according to the present embodiment.
Figure 3:
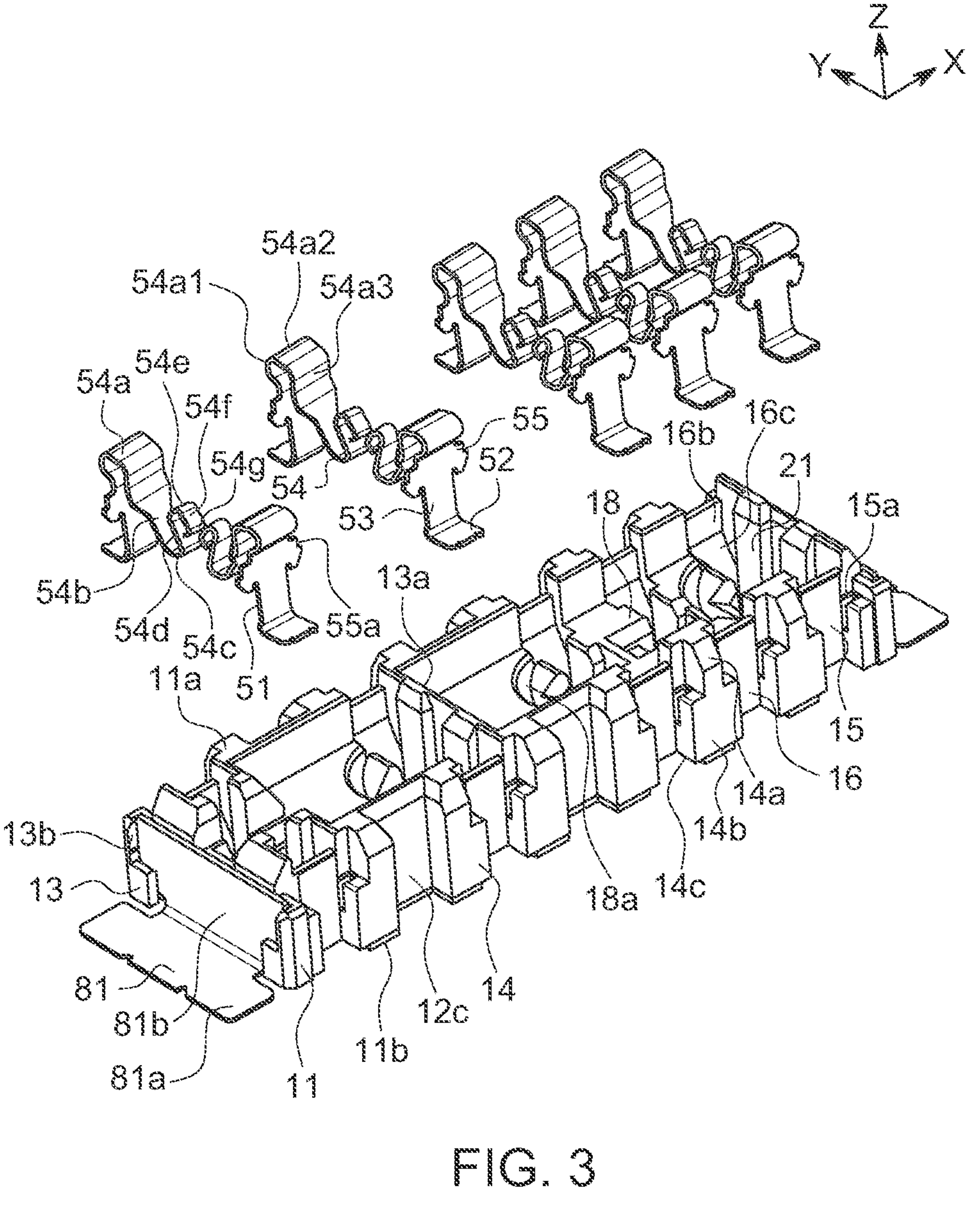
FIG. 3 is an exploded view of the first connector according to the present embodiment.
Figure 4A:
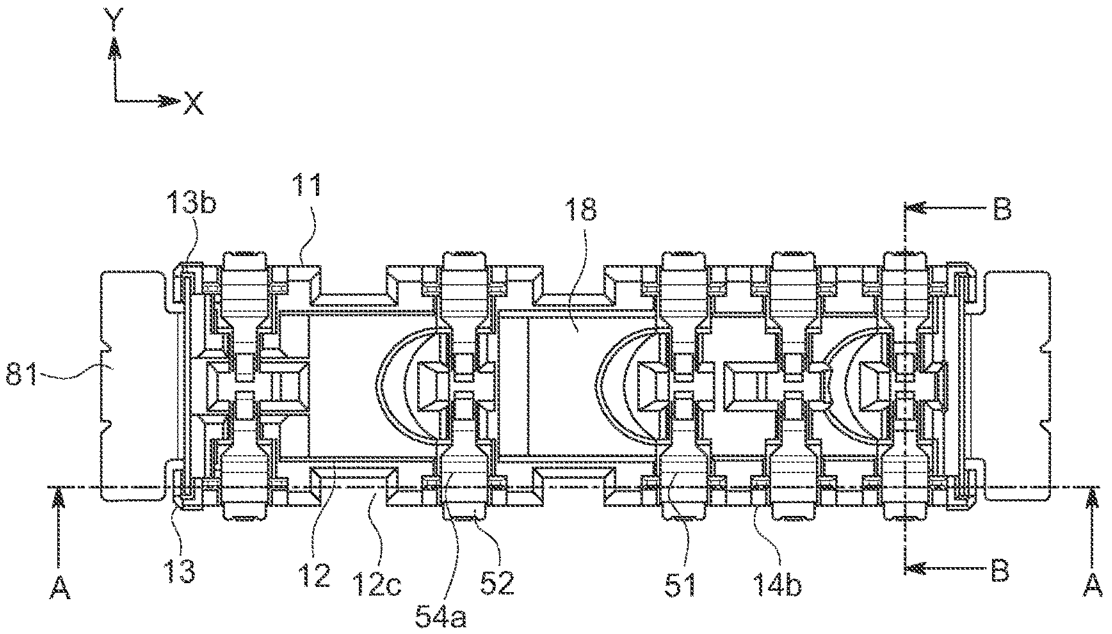
FIGS. 4A-4C are three view drawings of the first connector according to the present embodiment, where
Figure 4B:
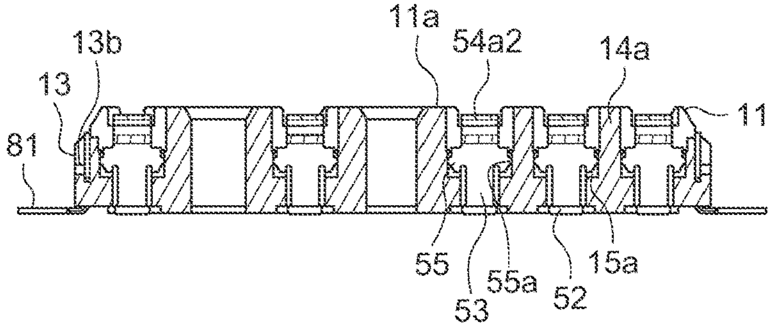
Figure 4C:
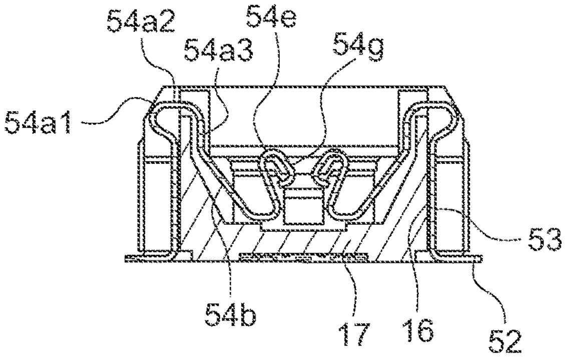
Figure 5A:
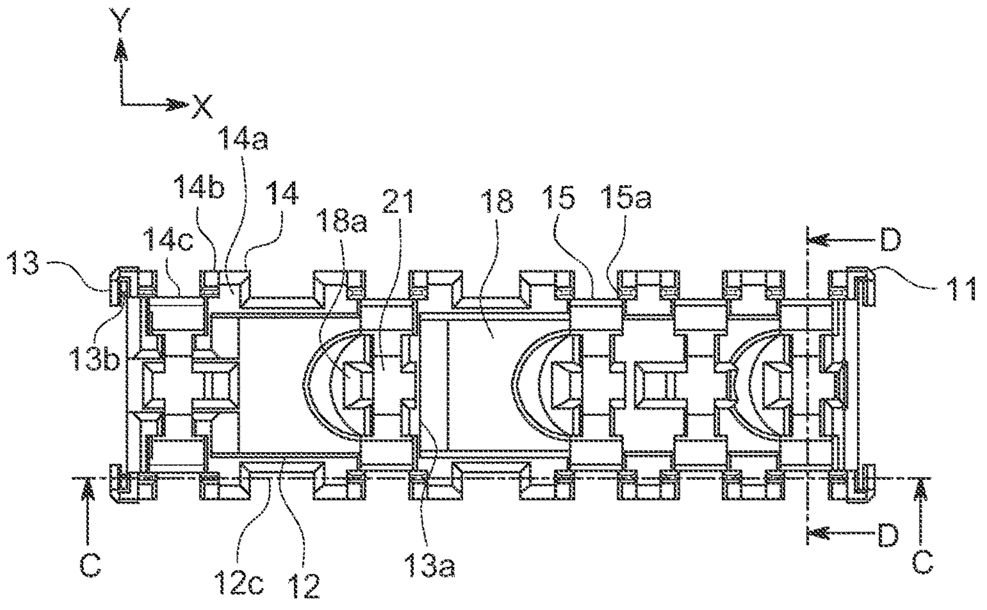
FIGS. 5A-5C are three view drawings of the first housing according to the present embodiment, where
Figure 5B:
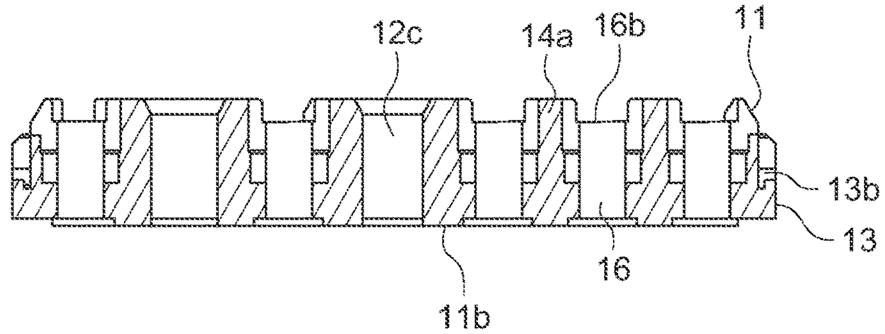
Figure 5C:
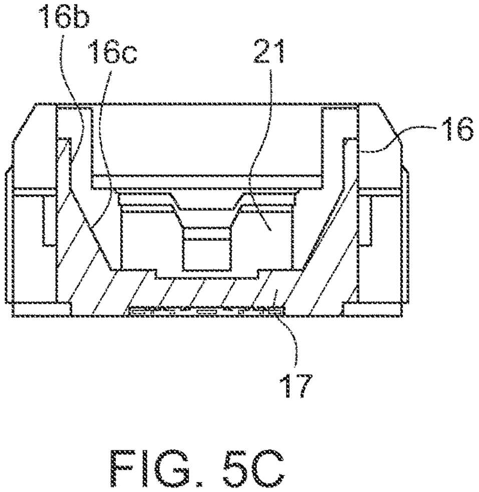
Figure 6:
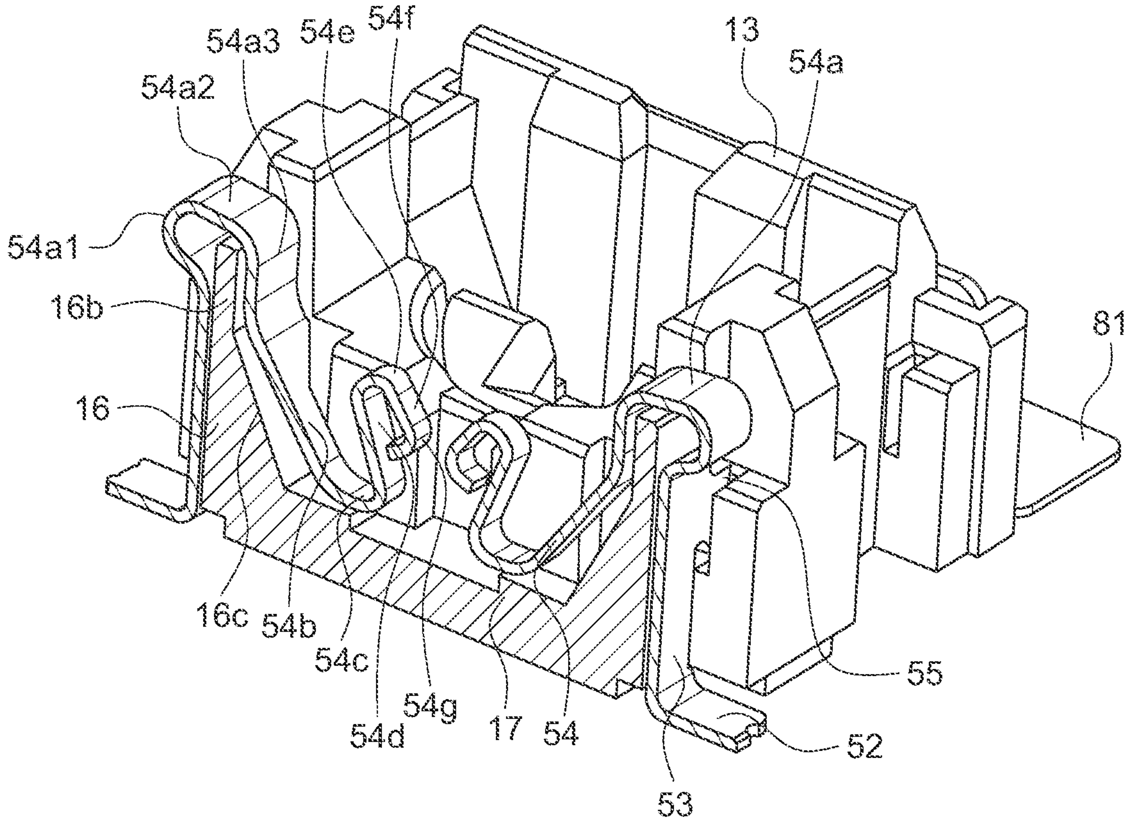
FIG. 6 is a cross sectional perspective view of the essential parts of the first connector according to the present embodiment.

FIGS. 1A and 1B are perspective views seen from the side of the second connector illustrating the positional relationship between the first connector and the second connector according to the present embodiment before mating. FIG. 2 is a perspective view of the first connector according to the present embodiment. FIG. 3 is an exploded view of the first connector according to the present embodiment. FIGS. 4A-4C are three view drawings of the first connector according to the present embodiment. FIGS. 5A-5C are three view drawings of the first housing according to the present embodiment. FIG. 6 is a cross sectional perspective view of the essential parts of the first connector according to the present embodiment. Note that in FIGS. 1A and 1B, FIG. 1A is an oblique view from the front and FIG. 1B is an oblique view from the rear. In FIGS. 4A-4C, FIG. 4A is a plan view, FIG. 4B is a cross sectional view taken along the A-A line in FIG. 4A and FIG. 4C is a cross sectional view taken along the B-B line in FIG. 4A. In FIGS. 5A-5C, FIG. 5A is a plan view, FIG. 5B is a cross sectional view taken along the C-C line in FIG. 5A, and FIG. 5C is a cross sectional view taken along the D-D line in FIG. 5A.

In the diagrams, 1 is a connector according to the present embodiment and is a first connector as one side of the connector assembly. The first connector 1 is a surface-mounted board connector mounted on the surface of a board (not shown) as a mounting member, and is mated together with a second connector 101 as the counterpart connector. The board, for example, can be various types of boards, such as a printed circuit board, a flexible flat cable (FFC), a flexible printed circuit (FPC), and the like used for electronic devices and the like. The second connector 101 is the other side of the connector assembly and is a connector attached by a securing member such as a bolt, rivet, or the like to an attaching member such as a mounting member (not shown).

Note that in the present embodiment, expressions indicating direction such as top, bottom, left, right, front, rear, and the like used to describe a configuration and operation of each part of the first connector 1 and the second connector 101 are relative rather than absolute, and are proper when each part of the first connector 1 and the second connector 101 are in positions illustrated in the drawings, but should be changed and interpreted according to a change in position with a change in posture.

Furthermore, the first connector 1 has a first housing 11 as a first connector body integrally formed of an insulating material such as synthetic resin. As illustrated in the drawing, the first housing 11 has a substantially rectangular thick plate shape, which is a substantially rectangular object, and a recess part 21 surrounded by a periphery is formed on the mating side of the second connector 101, in other words on the mating surface 11*a* side (positive direction of Z axis). A first contact part 54 of a first terminal 51 as the terminal is stowed in the recess part 21, and a second power terminal 151 or a second signal terminal 161 as the counterpart terminal described below of the second connector 101 enters the recess part 21.

The second connector 101 has a second housing 111 as a second connector body integrally formed by an insulating material such as a synthetic resin. As illustrated in FIGS. 1A and 1B, the second housing 111 includes a power terminal mounting part 113 to which the second power terminal 151 is mounted, a signal terminal mounting part 112 to which the second signal terminal 161 is mounted, a flat plate flange part 114, and a mating part 115 that protrudes from the flange part 114 towards the side mating with the first connector 1, or in other words, the side of a mating surface 111*a* (negative Z-axis direction). When the first connector 1 and the second connector 101 are mated, the first housing 11 enters and is housed in a mesh recess part 115*a* described below, which is formed on the mating part 115, from the mating surface 111*a* of the second housing 111. Note that the flange part 114 is formed with a through-hole 114*a* through which a securing member such as a bolt, rivet, or the like (not shown) is inserted to mount the second connector 101 to the mounting member.

According to the present embodiment, the first housing 11 has a pair of side walls 12 extending in the longitudinal direction (X-axis direction) and a pair of end walls 13 extending in the width direction (Y-axis direction) connected to both ends of the pair of side walls 12. An outer wall 14 is formed on the outer side of each side wall 12 (outer side in the width direction of the first housing 11), and a terminal retaining part 15 is formed between the outer wall 14 and the side wall 12 and is an open space for retaining the first terminal 51. Both longitudinal ends of the first housing 11 in each terminal retaining part 15 are demarcated by an outer wall connecting part 14*a* that extends in the vertical direction (Z-axis direction) to connect the outer wall 14 and the side wall 12. Note that the mounting surface 11*b* (lower surface) side of the first housing 11 is closed off by a bottom wall 17. In addition, each end wall 13 is formed with a metal fitting retention part 13*b* for retaining auxiliary fittings 81. The auxiliary fittings 81 are members having a substantially L shape when viewed from the side, and include a board securing part 81*a* for securing to the surface of the board, and a retained part 81*b* stowed within the metal fitting retaining part 13*b*.

Note that the outer wall 14 does not necessarily need to be formed continuously in the longitudinal direction of the first housing 11, but can be discrete and formed only at a location corresponding to the mounting position of the first terminal 51. In the example illustrated in the diagram, three sets of first terminals 51 are mounted relatively closely together near the front end (positive X-axis end) of the first housing 11, and two sets of first terminals 51 are mounted relatively discretely near the rear end (negative X-axis end) of the first housing 11; therefore, the outer wall 14 is formed continuously for the front half of the housing 11 and discretely for the rear half of the first housing 11. Furthermore, where the outer walls 14 are discrete, an outer side wall recess 12*c* is formed between the outer walls 14 that are adjacent to each other.

In addition, in the part corresponding to the mounting position of the first terminal 51 in the outer wall 14, a notch 14*c* is formed in the outer wall 14 that extends vertically, and the exterior of each terminal retaining part 15 is partially covered by a brim part 14*b* that extends from the outer wall connection part 14*a* at both ends. The brim part 14*b* is a flat plate member parallel to the side wall 12 extending in the vertical direction, and a retaining arm stowing part 15*a* is formed between the brim part 14*b* and the terminal retaining wall 16 as the side wall 12 of each terminal retaining part 15. The retaining arm housing part 15*a* is an open space in which at least a part of each retained piece 55 of the first terminal 51 is stowed, and is a narrow gap extending in the vertical direction demarcated on three sides by the outer wall connection 14*a*, the brim part 14*b*, and the terminal retaining wall 16.

Near the top end of the terminal retaining wall 16 is a thin-walled part 16*b* with a small dimension in respect to the width direction (Y-axis direction) of the first housing 11. Furthermore, on the inside of the terminal retaining wall 16 (within the width direction of the first housing 11), an inclined part 16*c* is formed on the lower side of the thin-walled part 16*b*. The inclined part 16*c* is a part inclined so as to approach the center of the width direction of the first housing 11 while progressing downwardly (negative Z-axis direction), so that the terminal retaining wall 16 has a substantially triangular cross-sectional shape as illustrated in FIG. 5C, and this increases the strength thereof.

The recess part 21, in which the first contact part 54 of the first terminal 51 is stowed, is a concave open space demarcated on three sides by the bottom wall 17 and the left and right terminal retaining walls 16, and open on the side of the mating surface 11*a* (top surface). The recess parts 21 are formed discretely in the longitudinal direction of the first housing 11, specifically, only at the parts corresponding to the mounting positions of the first terminal 51. A thick-walled bottom part 18 is formed between recess parts 21 that are adjacent to each other that has a large dimension in the vertical direction (Z-axis direction) with regards to that of the bottom wall 17. The bottom surface of the thick-walled bottom part 18 is flush with the bottom surface of the bottom wall 17 and is the mounting surface 11*b* of the first housing 11. The top surface of the thick-walled bottom part 18 is positioned above the top surface of the bottom wall 17 and is close to the mating surface 11*a* of the first housing 11 and therefore, depending on the shape or angle of the second power terminal 151 or second signal terminal 161 as the counterpart terminal entering the recess part 21, there may be interference therewith. Here, in order to avoid interference with the counterpart terminal, an interference avoidance recess part 18*a* is preferably formed on the upper surface of the thick-walled bottom part 18. In addition, in the example illustrated in the diagram, an intermediate end wall 13*a* is formed at one location at the boundary between the recess part 21 and the thick-walled bottom 18, extending parallel to the end wall 13, connecting a pair of side walls 12, and having an upper surface flush with the mating surface 11*a*, but the intermediate end wall 13*a* may be omitted as appropriate.

In the example illustrated in the diagram, the terminal retaining part 15 is formed in a total of ten locations, five on each side of the first housing 11, and thus a total of ten first terminals 51 are attached to the first housing 11. However, the number of terminal retaining parts 15 and first terminals 51 is not limited to this, and can be changed as appropriate. Note that the second connector 101 includes a second power terminal 151 that is a power terminal connected to the power line, and a second signal terminal 161 that is a signal terminal connected to the signal line, as counterpart terminals. However, the first terminals 51 of the first connector 1 are not classified into power terminals and signal terminals. Therefore, the first terminal 51 in contact with the second power terminal 151 functions as a power terminal connected to the power line, and the first terminal 51 in contact with the second signal terminal 161 functions as a signal terminal connected to the signal line. The front end of the first housing 11 is illustrated in the example in the diagram and a pair of first terminals 51 located at the third and fourth from this end function as signal terminals, and the pair of first terminals 51 located second and fifth from the front end function as power terminals. Furthermore, each second power terminal 151 and each second signal terminal 161 makes contact with a pair of first terminals 51 on the left and right, respectively.

Moreover, the first terminal 51 is a member integrally formed by punching, bending, or otherwise processing a conductive metal plate, includes a main body part 53, a tail part 52 connected to the lower end of the main body part 53, the first contact part 54 which serves as the contact part and is connected to the upper end of the center portion of the main body part 53, and the pair of retained pieces 55 that are connected to the upper end on both left and right sides of the main body part 53.

The main body part 53 is a flat plate member with a substantially rectangular shape and is stowed and retained within the terminal retaining part 15 of the first housing 11. In addition, the tail part 52 is bent and connected to the main body part 53 and extends in the left and right directions (Y-axis direction), or in other words outwardly in the width direction of the first housing 11, and is connected and secured to a connecting pad connected to a conductive trace on the board by soldering or the like.

The retained piece 55 is a member formed to extend outwardly in the width direction of the main body 53 from the upper end of the main body 53 and includes an engaging protrusion **55*a* protruding outwardly in the width direction of the main body 53 from an outer edge thereof. The retained piece 55 is press-fit and stowed within the retaining arm stowing part 15*a* of the terminal retaining part 15, and the engaging protrusion 55*a* encroaches into the side of the outer wall connecting part 14*a* demarcating the side of the retaining arm stowing part 15*a* with respect to the longitudinal direction of the first housing 11, and is secured to the outer wall connecting part 14*a*. Thus, the left and right retained pieces 55 are retained by the terminal retaining part 15 in a secure manner, and as such, the main body part 53 is retained in the terminal retaining part 15** in a non-displaceable manner.

The first contact part 54 includes a connector base **54*a* with a base end connected to the main body 53, a first connecting arm 54*b* connected to the end of the connector base 54*a* and extends diagonally downward, a downward flexure part 54*c* connected to the end (lower end) of the first connecting arm 54*b* and curved diagonally upward by approximately 180 degrees, a second connecting arm 54*d* connected to the tip (upper end) of the downward flexure part 54*c* and extends diagonally upward, an upward flexure part 54*e* connected to the tip (upper end) of the second connecting arm 54*d* and curved approximately 180 degrees diagonally downward, a contact arm 54*f* connected to the tip (lower end) of the upward flexure part 54*e* and extends diagonally downward, and a contact flexure part 54*g* formed near the free end (lower end) of the contact arm 54*f*. Furthermore, the connector base 54*a* includes an outward expanding part 54*a*1 that bulges outward from the top end of the main body 53 in the width direction of the first housing 11, a horizontal upper surface 54*a*2 as an upper part extending inward from the top end of the outward expanding part 54*a*1 in the width direction of the first housing 11 and parallel (horizontal) with the mating surface 11*a*, and an inner vertical part 54*a*3 bent relative to and connected to the inside end of the first housing 11 in the width direction at the horizontal upper surface 54*a*2 and extends downwards. Note that the horizontal upper surface 54*a*2** does not necessarily have a flat shape, and may have a curved shape that extends upward.

With this configuration, the first contact part 54 as illustrated in FIGS. 4C and 6, in a state where the first terminal 51 is mounted on the first housing 11, extends towards the inside of the side walls 12 by straddling the terminal retaining wall 16, without contacting the terminal retaining wall 16 as the side walls 12 of the terminal retaining part 15. Specifically, as the outward expanding part **54*a*1 bulges outward in the width direction of the first housing 11, the inner vertical part 54*a*3 is positioned closer to the inner side of the first housing 11 in the width direction of the first housing 11 than the inner side of the thin-walled part 16*b*, and the horizontal upper surface 54*a*2 connecting the outward expanding part 54*a*1 and the inner vertical part 54*a*3 to the thin-walled part 16*b* is not positioned higher than the upper end of the thin-walled part 16*b*, so the connector base 54*a* does not make contact with the thin-walled part 16*b*. The first connecting arm 54*b* is positioned obliquely above the inclined part 16*c* and therefore does not contact the inclined part 16*c*. Therefore, the first contact part 54 can be freely deformed or displaced without interfering with the terminal retaining wall 16**.

For example, even if contact pressure is applied to the contact flexure part **54*g* by making contact with the second power terminal 151 or the second signal terminal 161 causing the contact flexure part 54*g* to be displaced downward, the outward expanding part 54*a*1 bulges outwardly in the width direction of the first housing 11 to the outer surface of the thin-walled part 16*b* and becomes significantly separated from the outer surface of the thin-walled part 16*b*. As such, the entire connector base 54*a* can be displaced so that the entire connector base 54*a* faces inwardly obliquely downward in the width direction of the first housing 11, bowing without interfering with the terminal retaining wall 16. Here, the entire first contact part 54 functions as if the outward expanding part 54*a*1 is the fulcrum and the contact flexure part 54*g* is the point of action, and since the fulcrum and the point of action are displaced in the vertical direction, the entire first contact part 54 operates as if being pivoted around the outward expanding part 54*a*1**, which is the fulcrum.

The outward expanding part **54*a*1 is curved as such to bulge outwardly in the width direction of the first housing 11**, to function as a spring itself and can absorb vibrations in the vertical (Z-axis) direction.

Furthermore, the portion from the first connecting arm **54*b* to the free end of the contact arm 54*f* is a spring arm, which is a plate material with a narrower width than the main body 53 and the connector base 54*a* connected to the main body 53, and thus can be elastically deformed in the width direction (X-axis direction) of the first terminal 51** and can absorb vibrations in the width direction.

Note that as not only the outward expanding part **54*a*1 but also the horizontal upper surface 54*a*2 and the inner vertical part 54*a*3 also function as a spring, regarding the first terminal 51, the range from the base end of the connector base 54*a* connected to the main body 53 to the free end of the contact arm 54*f* functions as a spring, and the path (spring length) of the part that functions as a spring is long. Therefore, for example, even if the contact flexure part 54*g* is subjected to an external force due to contact with the second power terminal 151 or the second signal terminal 161, the external force is not readily transmitted to the main body 53**.

As the spring arms are curved generally in an S-shape and have a longer spring length from the perspective of the longitudinal direction of the first housing 11, they are therefore very flexible, and can be flexibly deformed in two flexure parts, particularly in the downward flexure part **54*c* and the upward flexure part 54*e***.

As illustrated in FIGS. 4C and 6, with a pair of left and right first terminals 51 mounted in the first housing 11, the left and right contact arms **54*f* extend diagonally downwardly opposing each other, and the spacing between the contact arms becomes narrower the further down, with the space becoming the minimum distance thereof at the contact flexure part 54*g*. Thus, the second power terminal 151 or the second signal terminal 161, as the counterpart terminal, is smoothly inserted between the left and right contact arms 54*f*, which are opposed to each other. In addition, as the spring length of the part from the first connecting arm 54*b* to the contact flexure part 54*g* is long and flexible, the left and right contact flexure parts 54*g* can reliably maintain contact with the second power terminal 151 or the second signal terminal 161**.

In this manner, as the first contact part 54 can be freely deformed or displaced without interfering with the terminal retaining wall 16, even if the first terminal 51 is displaced relative to the first housing 11, misalignment of the first contact part 54 can be effectively absorbed, and the first contact part 54 can reliably maintain contact with the counterpart terminal. Therefore, providing of a member for absorbing misalignment, such as the bending piece 855 of the terminal 851 of the conventional connector described in the "Background Technology" section, is not necessary for the main body 53 or other parts of the first terminal 51, allowing for an overall more compact and low-profile first terminal 51.

Next, the configuration of the second connector 101 will be described.

Figure 7:
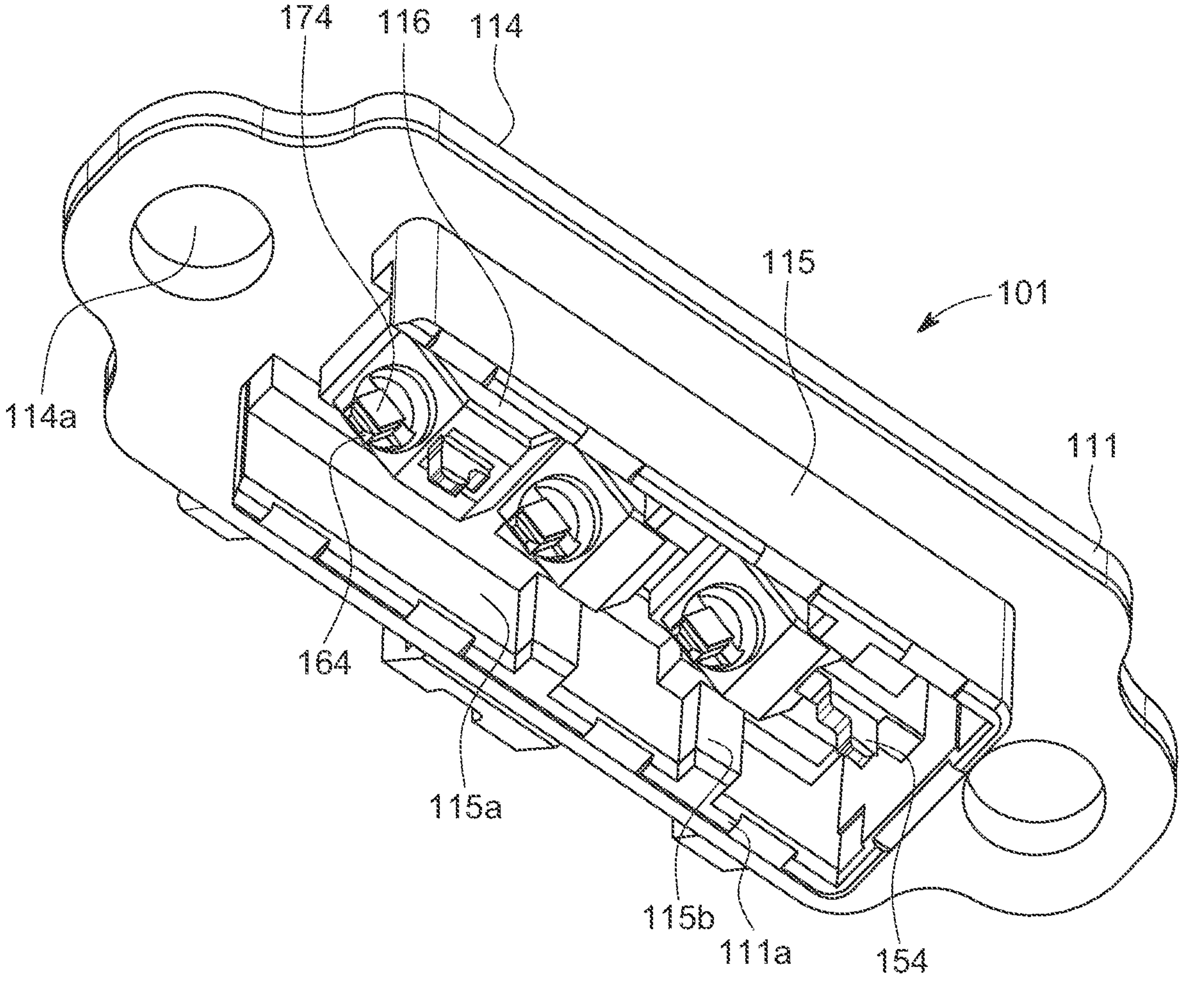
FIG. 7 is a perspective view from the mating surface side of the second connector according to the present embodiment.
Figure 8:
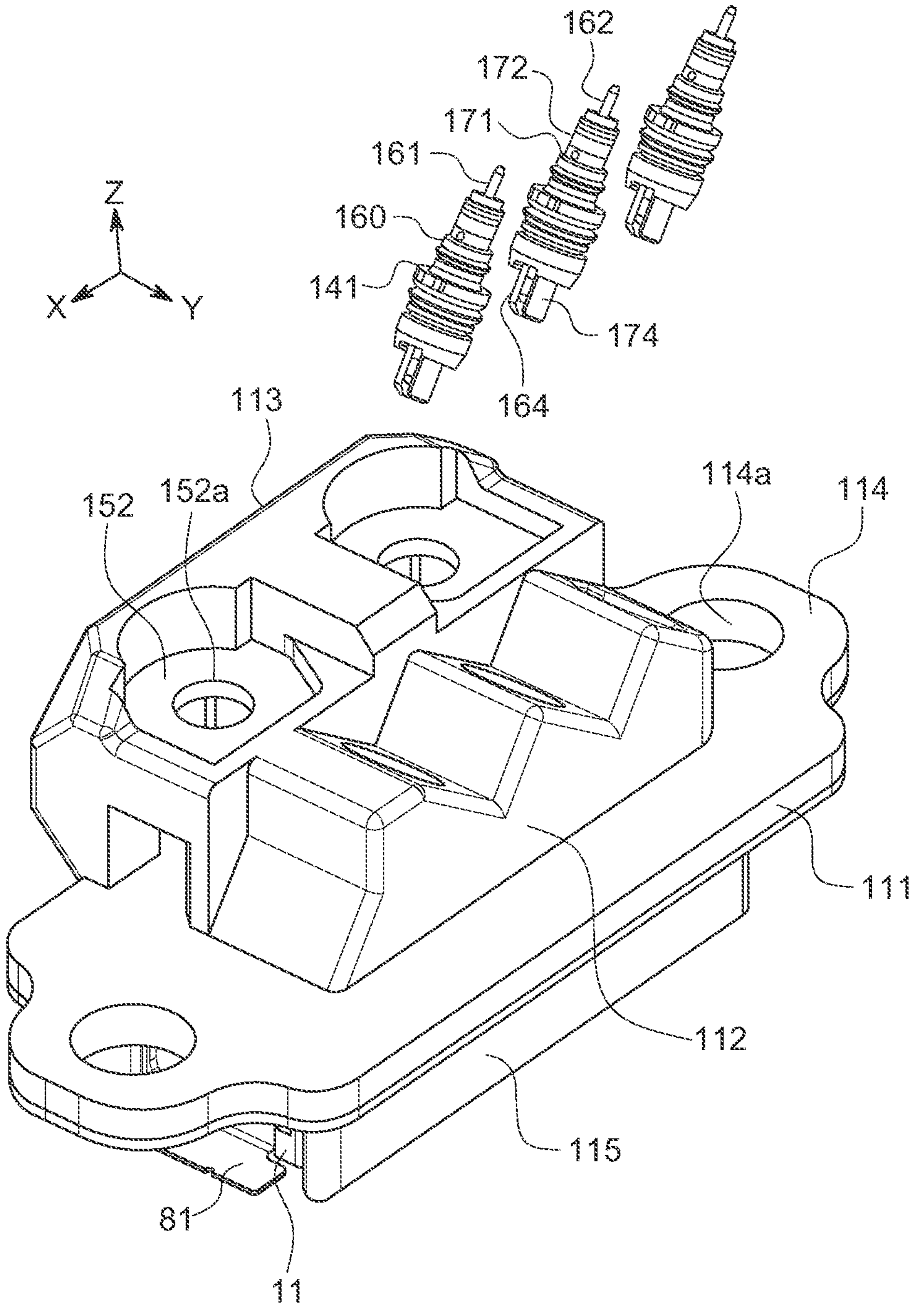
FIG. 8 is a perspective view illustrating removal of the relay connector from the second connector mated with the first connector according to the present embodiment.
Figure 9:
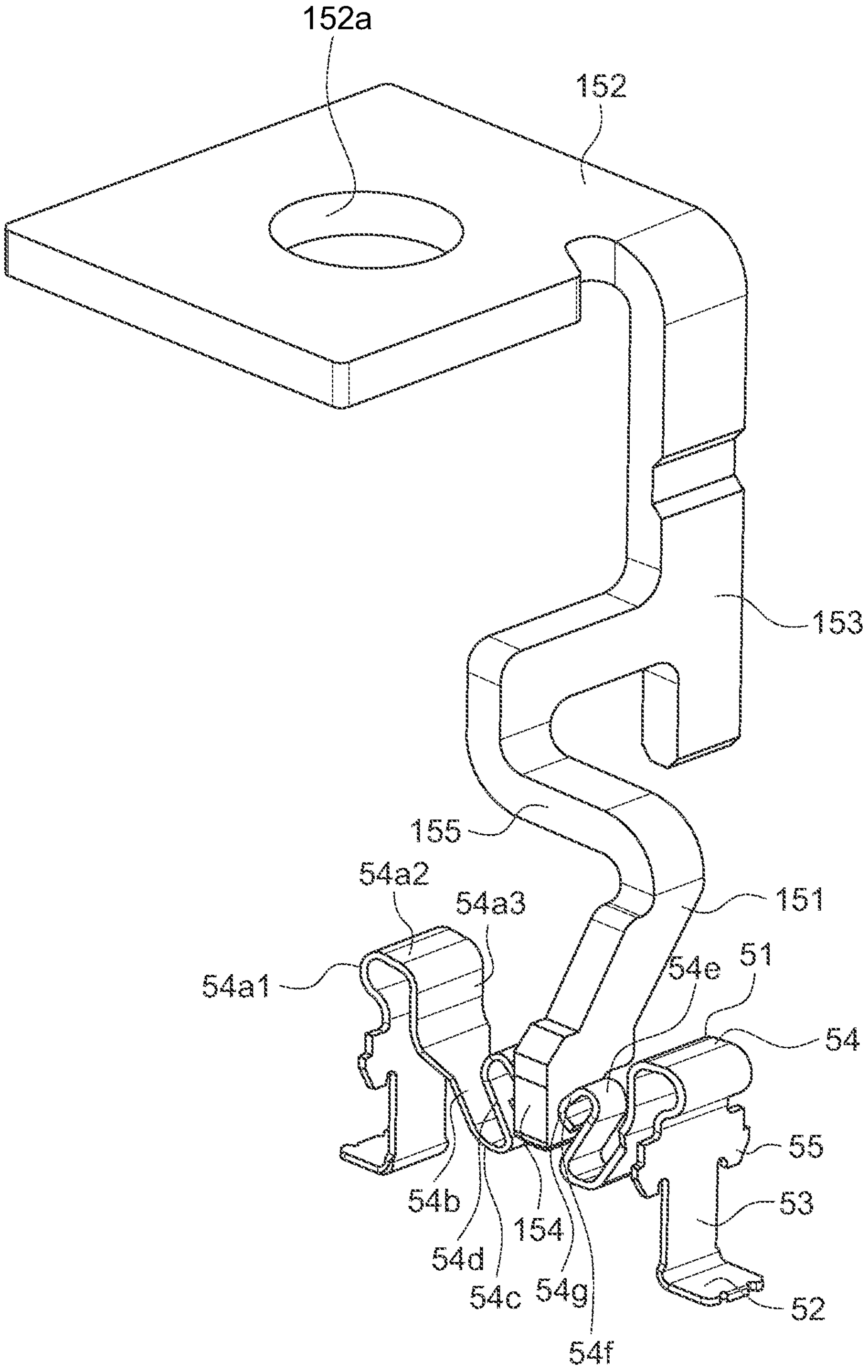
FIG. 9 is a perspective view illustrating the contact state between the first terminal and second power terminal according to the present embodiment.
Figure 10:
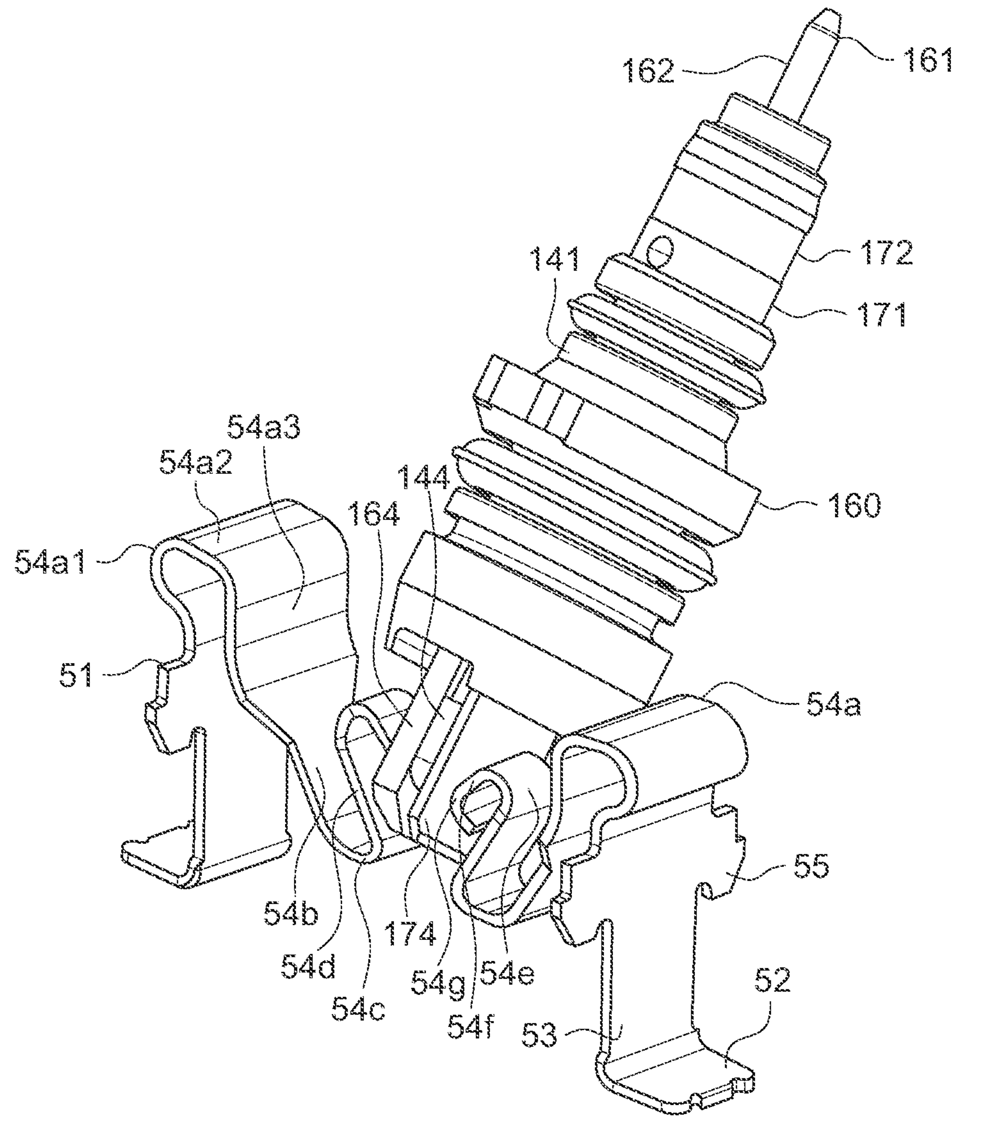
FIG. 10 is a perspective view illustrating the contact state of the first terminal and the second signal terminal according to the present embodiment.
Figure 11A:
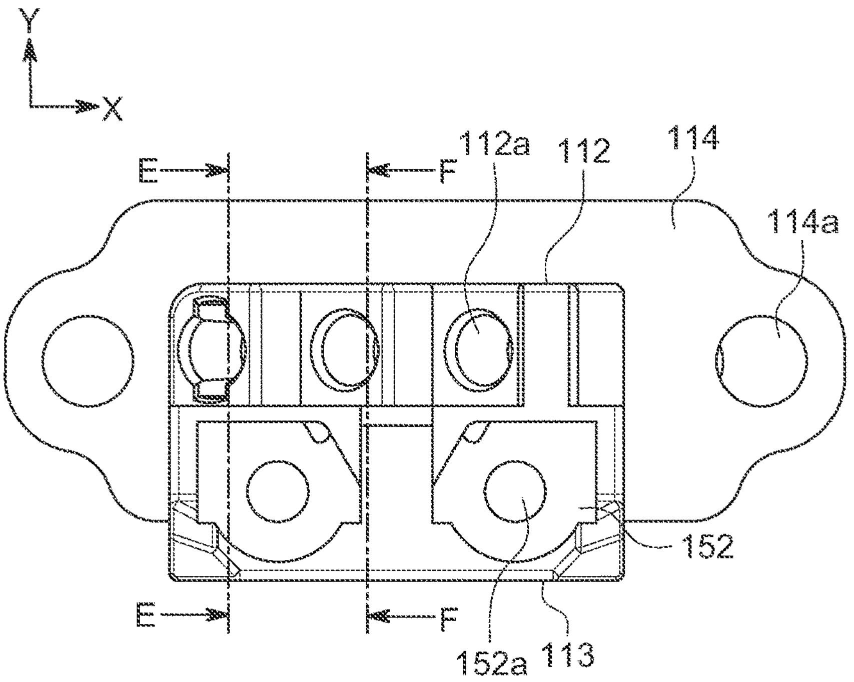
Figure 11B:
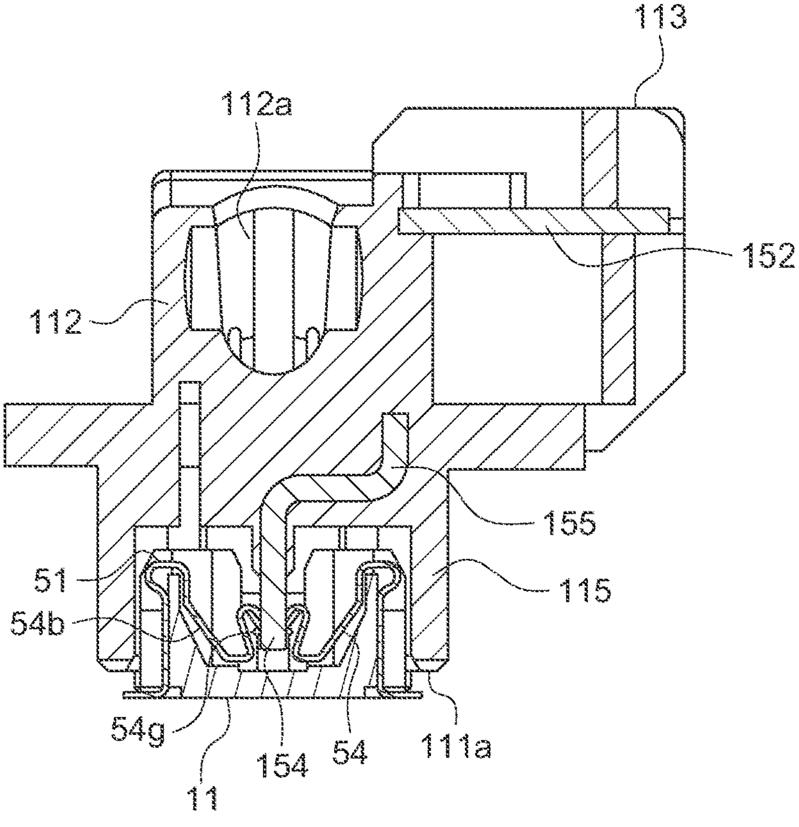
Figure 11C:
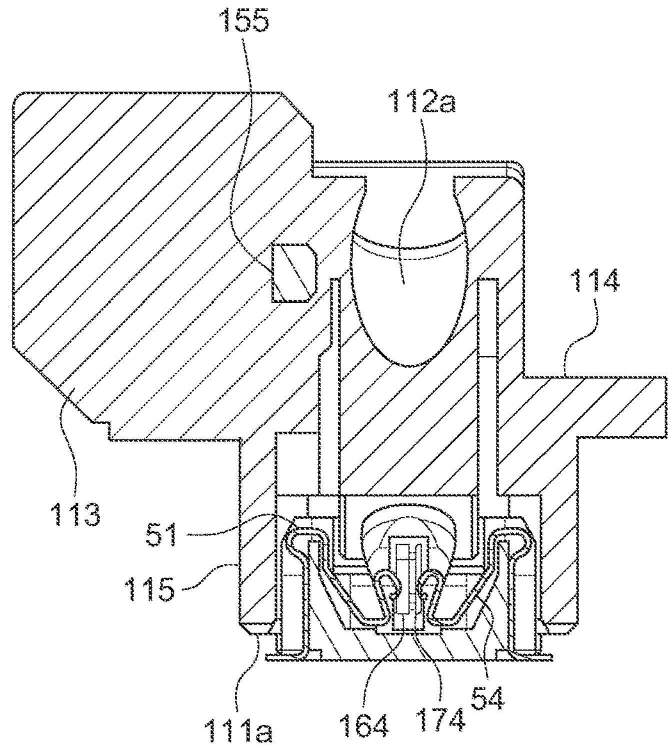
Figure 12:
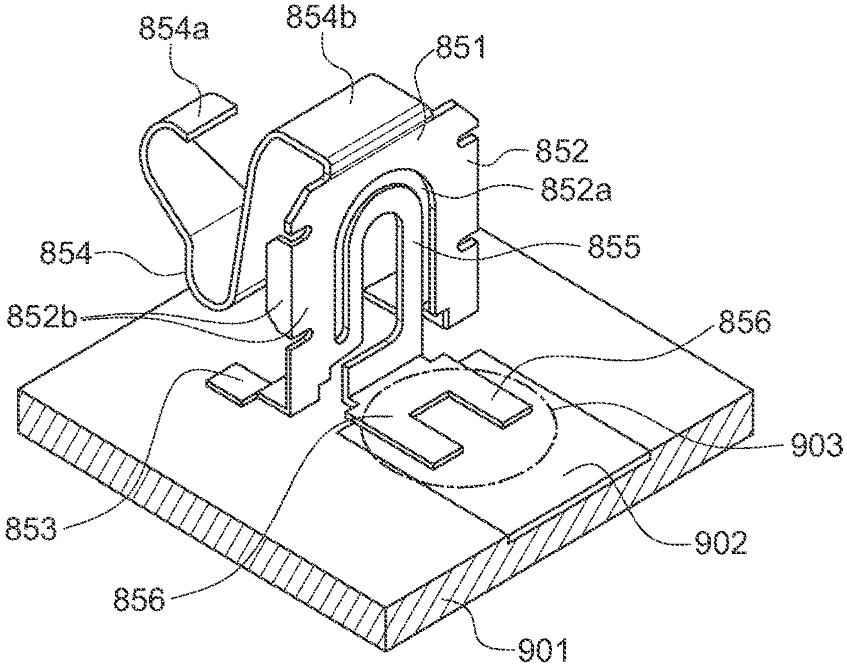
FIG. 12 (Prior Art)
FIG. 12 is a perspective view illustrating the terminals of conventional connectors.

FIG. 7 is a perspective view of the second connector of the present embodiment viewed from the side of the mating surface thereof. FIG. 8 is a perspective view of a state where a relay connector is removed from the second connector mated with the first connector of the present embodiment. FIG. 9 is a perspective view illustrating the contact state between the first terminal and the second power terminal of the present embodiment. FIG. 10 is a perspective view illustrating the contact state of the first terminal and the second signal terminal of the present embodiment. FIGS. 11A-11C are three view drawings illustrating the mated stated of the first connector and the second connector of the present embodiment. Note that in FIGS. 11A-11C, FIG. 11A is a plan view, FIG. 11B is a cross sectional view taken along the E-E line in FIG. 11A, and FIG. 11C is a cross sectional view taken along the F-F line in FIG. 11A.

Regarding the present embodiment, the second connector 101 is provided with a second power terminal 151 as a counterpart terminal. The second power terminal 151 is a member integrally formed by punching, bending, or otherwise processing a conductive metal plate, including a main body 153, a flat-plate connector 152 bent and connected to an upper end of the main body part 153, a bent rod-like contact arm 155 connected to an end near the lower end of the main body 153, and a flat-plate contact part 154 connected to the lower end of the contact arm 155. A through-hole **152*a* is formed in the center of the connector 152 through which a conductive connection member such as a bolt for connecting a conductive wire, a conductive terminal, and the like is inserted. A female screw should be formed on the inner surface of the through-hole 152*a*. The second terminal 151 is integrated with a second housing 111 by insert molding (overmolding) Therefore, the second power terminal 151 is embedded in the second housing 111, excluding the connector 152, which is exposed on the top surface of the power terminal mounting part 113, and the contact part 154, which protrudes downward from a terminal support part 116 formed on the ceiling surface of a mesh recess part 115*a* of the mating part 115**.

Note that while there are two second power terminals 151 in the example illustrated in the diagram, this can be changed as needed. In the example illustrated in the diagram, the conductive wire, conductive terminal, and the like of the positive power line is connected to the connector 152 of one second power terminal 151, and the conductive wire, conductive terminal, and the like of the negative power line is connected to the connector 152 of the other second power terminal 151.

When the first connector 1 and the second connector 101 are mated, each contact part 154 of the second power terminal 151 is inserted between the contact arms **54*f* of the corresponding pair of first terminals 51 and sandwiched by the left and right contact flexure parts 54*g*. This causes each second power terminal 151 and the corresponding pair of first terminals 51** to make contact and conduct.

A relay connector 160 including a second signal terminal 161 as a counterpart terminal is attached to the second connector 101. The relay connector 160 includes a relay housing 141 integrally formed using an insulating material such as synthetic resin and a second signal terminal 161 integrally formed by punching, bending or otherwise processing a conductive metal plate. The second signal terminal 161 is integrated with the relay housing 141 by insert molding (overmolding), with a connector 162 formed at one end and a contact part 164 formed at the other end of the second signal terminal 161 protruding from the top and bottom ends of the relay housing 141, and any other parts are embedded within the relay housing 141. Note that while there are three relay connectors 160 in the example illustrated by the diagram, this can be changed as needed.

Each relay connector 160 is inserted from above into each of the relay terminal stowing holes **112*a* formed in the signal terminal mounting part 112 of the second housing 111. Thus, the contact part 164 of the second signal terminal 161 protrudes downward from the terminal support part 116 formed on the ceiling surface of the mesh recess part 115*a* of the mating part 115. In addition, the connector 162 of the second signal terminal 161 is positioned in the relay terminal stowing hole 112*a*. In addition, the end of a signal conductor wire such as a coaxial cable or the like not shown in the diagram is inserted into the relay terminal stowing hole 112*a* and connected to the connector 162. When the first connector 1 and the second connector 101 are mated, the contact part 164 of each second signal terminal 161 is inserted between the contact arms 54*f* of the corresponding pair of first terminals 51 and sandwiched by the left and right contact flexure parts 54*g*. This causes each second signal terminal 161 and the corresponding pair of first terminals 51** to make contact and conduct.

Note that the relay connector 160 may further include a second ground terminal 171 as a counterpart terminal, as in the example illustrated in the diagram. Here, the second ground terminal 171, similar to the second signal terminal 161, is integrally formed by punching, bending, or otherwise processing a conductive metal plate, and is integrated with the relay housing 141 by insert molding (overmolding). A connector 172 formed at one end of the second ground terminal 171 has a substantially cylindrical shape and is exposed on the surface of the substantially cyclical-shaped part near the top of the relay housing 141. A contact part 174 formed at the other end of the second ground terminal 171 protrudes from the lower end of the relay housing 141, parallel to the contact part 164 of the second signal terminal 161. Furthermore, an interposing part 144 protrudes from the lower end of the relay housing 141, interposed between the contact part 164 of the second signal terminal 161 and the contact part 174 of the second ground terminal 171.

Furthermore, a shielding member of a signal conductor wire such as a coaxial cable inserted in the relay terminal stowing hole **112*a* is connected to the connector 172 of the second ground terminal 171. When the first connector 1 and the second connector 101 are mated, one of the contact flexure parts 54***g* of the corresponding pair of first terminals 51 contacts the contact part 164 of the second signal terminal 161, while the other contact flexure part 54*g* contacts the contact part 174 of the second ground terminal 171. In other words, in the example illustrated in the diagram, of the pairs of first terminals 51 positioned on the front end of the first housing 11 and those positioned third and fourth from the front end, one functions as a signal terminal and the other functions as a ground terminal.

Furthermore, ridge parts 115*b* extending vertically are formed at a plurality of locations on the inner wall in the mesh recess part 115*a* of the mating part 115 of the second housing 111. Each of the ridge parts 115*b* corresponds to a side wall outer recess 12*c* formed between the outer walls 14 of the first housing 11. When the first connector 1 and the second connector 101 are mated, the protruding channels are stowed in and engage with the outer side wall recess 12*c*. This provides for the relative positioning of the first housing 11 and the second housing 111 mutually mated to each other.

After the first connector 1 and the second connector 101 are mated, the second housing 111 is attached to a mounting member (not shown) by a securing member such as a bolt, rivet or the like inserted into the through-hole 114*a* of the flange part 114. During this mounting process, a change in posture or position may occur to the second housing 111 due to external forces, and a change in posture or misalignment may also occur with the first housing 11 mated with the second housing 111. This causes a misalignment between the first housing 11 and the first terminal 51, to which the tail part 52 is secured by soldering or the like to the connection pad connected to the conductive trace of the board. Even in this case, as the main body part 53 is retained by the terminal retaining part 15 in a state of being freely displaceable both left and right and up and down, the misalignment between the first terminal 51 and the first housing 11 is effectively absorbed.

Thus, in the present embodiment, the first connector 1 is provided with a first housing 11 and first terminals 51 that are mounted in the first housing 11, is mounted on a board, and mated with the second connector 101. In addition, the first terminal 51 includes the main body part 53 retained in the first housing 11 and the first contact part 54 which is connected to the upper end of the main body part 53 and of which free ends can be connected to the counterpart terminals of the second connector 101. The first contact part 54 includes the connector base 54*a* that is connected to the upper end of the main body part 53, the part from the first connecting arm 54*b* to the contact arm 54*f* curved in a substantially s-shape and functions as a spring arm and is connected to the tip of the connector base 54*a*, and the contact flexure part 54*g* formed near the free end thereof. The first housing 11 includes the pair of side walls 12 that extend in the longitudinal direction thereof and the terminal retaining part 15 formed outside the side walls 12 and retains the main body part 53. The connector base 54*a* includes the outward expanding part 54*a*1 that bulges outward from the upper end of the main body part 53 toward the first housing 11; the horizontal upper surface 54*a*2 that extends inward from the upper end of the outward expanding part 54*a*1 toward the first housing 11; and the inner vertical part 54*a*3 that is bent and connected to the inner end of the horizontal upper surface 54*a*2 and extends downward. The connector base straddles the side walls 12 without making contact with the side walls 12.

This allows the first connector 1 to be equipped with the first terminal 51 with high space efficiency, improves reliability based on a compact and low profile, and can suitably absorb misalignment of the first contact part 54.

In addition, the first contact part 54 rotates using the outward expanding part 54*a*1 as a fulcrum when the contact flexure part 54*g* comes into contact with the counterpart terminal and contact pressure is applied. Thus, the first contact part 54 can be displaced to point inwardly and diagonally downward, as if bowing, in the width direction of the first housing 11 without interfering with the terminal retaining wall 16.

Furthermore, the outward expanding part 54*a*1 is capable of absorbing vibrations in the vertical direction based on elastic deformation. Therefore, even if the contact flexure part 54*g* comes into contact with the counterpart terminal and is subjected to vibration in the vertical direction, such vibration is not transmitted to the main body 53 and the first housing 11.

Furthermore, the part from the first connecting arm 54*b* to the contact arm 54*f*, which functions as a spring arm, includes a plate material that is narrower than the connector base 54*a* and is capable of absorbing vibrations in the width direction of the first terminal 51 by elastic deformation in the width direction of the first terminal 51. Therefore, even if the contact flexure part 54*g* contacts the counterpart terminal and is subjected to vibration in the width direction of the first terminal 51, such vibration is not transmitted to the main body 53 and the first housing 11.

Furthermore, the part from the first connecting arm 54*b* to the contact arm 54*f*, which functions as a spring arm, includes two flexibly deformable flexure parts. In this manner, because of the high flexibility of the spring arm, the contact flexure part 54*g* can reliably maintain contact with the counterpart terminal.

Note that the disclosure herein describes features relating to suitable exemplary embodiments. Various other embodiments, modifications, and variations within the scope and spirit of Scope of the patent Claims appended hereto will naturally be conceived of by those skilled in the art upon review of the disclosure herein.

The present disclosure can be applied to a connector and a connector assembly.

The invention claimed is:

1. A connector comprising:

a connector main body and terminals attached to the connector main body and configured to be mated with a counterpart connector, the connector main body including a pair of side wall parts which extend in a longitudinal direction;

each terminal comprising a main body part retained in the connector main body and a contact part connected to an upper end of the main body part;

each contact part comprising a connector base connected to the upper end of the main body part, an S-shaped spring arm having first and second ends, wherein the first end is connected to the tip of the connector base, and a contact flexure part connected to the second end of the spring arm, wherein pairs of the terminals face each other and the contact flexure part of each terminal in the respective pairs face each other, and the contact flexure parts of the terminals in the respective pairs are configured to engage opposite sides of a counterpart terminal of the counterpart connector therebetween;

wherein the side wall parts retain the main body parts; and wherein each connector base includes an outward expanding part that bulges outward from an upper end of the main body part an upper part that straddles over the respective side wall part without making contact therewith.

2. The connector according to claim 1, wherein the outward expanding part in each terminal provides a fulcrum when the respective contact flexure part comes into contact with the respective counterpart terminal and contact pressure is applied and the respective contact part rotates.

3. The connector according to claim 1, wherein the outward expanding part in each terminal is configured to absorb vibration in a vertical direction by elastic deformation.

4. The connector according to claim 1, wherein the spring arm in each terminal comprises a plate material narrower than the respective connector base and which is configured to absorb vibrations in a width direction of the respective terminal by elastic deformation.

5. The connector according to claim 1, wherein each spring arm includes two flexibly deformable flexure parts.

6. A connector assembly comprising the connector according to claim 1, and the counterpart connector.

7. The connector according to claim 1, wherein each contact flexure part is curved.

8. A connector assembly comprising the connector according to claim 7, and the counterpart connector.

9. The connector according to claim 7, wherein the contact flexure part curves downward from the second end of the S-shaped spring arm in each terminal.

10. A connector assembly comprising the connector according to claim 9, and the counterpart connector.

11. The connector according to claim 9, wherein each terminal further comprises a vertical part extending from the upper part, and an inclined part extending between the vertical part and the S-shaped spring arm.

12. A connector assembly comprising the connector according to claim 11, and the counterpart connector.

13. The connector according to claim 12, wherein the connector main body includes an inclined wall proximate to each inclined part.

14. The connector according to claim 7, wherein the contact flexure part curves downward from the second end of the S-shaped spring arm in each terminal and further curves inward toward the S-shaped spring arm in each terminal.

15. A connector assembly comprising the connector according to claim 14, and the counterpart connector.

16. The connector according to claim 1, wherein each upper part is horizontal in an unflexed condition.

17. The connector according to claim 1, wherein each terminal further comprises a vertical part extending from the upper part, and an inclined part extending between the vertical part and the S-shaped spring arm.

18. A connector assembly comprising the connector according to claim 17, and the counterpart connector.

19. The connector according to claim 17, wherein the connector main body includes an inclined wall proximate to each inclined part.

20. A connector assembly comprising the connector according to claim 3, and the counterpart connector.

* * * * *